US011750569B2

(12) United States Patent
Bharti et al.

(10) Patent No.: US 11,750,569 B2
(45) Date of Patent: Sep. 5, 2023

(54) PRIVATE CLOUD USER INSIGHT PRIVACY

(71) Applicant: International Business Machines Corporation, Armonk, NY (US)

(72) Inventors: Harish Bharti, Pune (IN); Rakesh Shinde, Pune (IN); Vijay Ekambaram, Chennai (IN); Abhay Kumar Patra, Pune (IN); Sandeep Sukhija, Sri Ganganagar (IN)

(73) Assignee: International Business Machines Corporation, Armonk, NY (US)

(*) Notice: Subject to any disclaimer, the term of this patent is extended or adjusted under 35 U.S.C. 154(b) by 204 days.

(21) Appl. No.: 17/115,859

(22) Filed: Dec. 9, 2020

(65) Prior Publication Data

US 2022/0182363 A1    Jun. 9, 2022

(51) Int. Cl.
*H04L 9/40* (2022.01)
*H04L 67/306* (2022.01)
*H04L 67/60* (2022.01)

(52) U.S. Cl.
CPC ........ *H04L 63/0421* (2013.01); *H04L 67/306* (2013.01); *H04L 67/60* (2022.05)

(58) Field of Classification Search
CPC .... H04L 63/0421; H04L 67/60; H04L 67/306
USPC .......................................................... 726/26
See application file for complete search history.

(56) References Cited

U.S. PATENT DOCUMENTS

| | | | |
|---|---|---|---|
| 9,521,218 B1 | 12/2016 | Fan | |
| 9,652,542 B2* | 5/2017 | Kottu | G06F 16/9535 |
| 10,018,993 B2 | 7/2018 | Lawson | |
| 10,108,817 B2 | 10/2018 | Riva et al. | |
| 10,332,108 B2* | 6/2019 | Ciurea | G06Q 20/383 |
| 10,444,995 B2 | 10/2019 | Cashman | |
| 10,489,845 B2 | 11/2019 | Mullakkara Azhuvath et al. | |
| 11,003,718 B2* | 5/2021 | McLean | H04L 63/20 |
| 11,023,842 B2* | 6/2021 | Beaumont | G06F 15/76 |
| 11,050,723 B1* | 6/2021 | Mahdavi | H04L 9/0844 |
| 11,120,176 B2* | 9/2021 | Wang | H04L 65/762 |
| 11,126,593 B2* | 9/2021 | Hurley | G06F 16/9024 |
| 11,144,954 B1* | 10/2021 | Xu | G07C 9/00 |
| 11,146,511 B1* | 10/2021 | Jayaram | H04L 51/216 |

(Continued)

FOREIGN PATENT DOCUMENTS

| CN | 103842972 A | 6/2014 |
|---|---|---|
| CN | 111263161 A | 6/2020 |

OTHER PUBLICATIONS

Shin, Heechang, Vaidya, Jaideep, and Atluri, Vijayalakshmi. 'A Profile Anonymization Model for Location-based Services'. Jan. 1, 2011 : 795-833. (Year: 2011).*

(Continued)

*Primary Examiner* — Melvin H Pollack
(74) *Attorney, Agent, or Firm* — Rachel M. Yadlosky

(57) ABSTRACT

A user-initiated request from a user device of a user is detected. The user-initiated request is directed to a product provider, the user-initiated request includes one or more parameters. an anonymized request is created based on the one or more parameters. The anonymized request is sent to the product provider. A provider response is received from the product provider. A targeted response is generated based on the one or more parameters of the user-initiated request and based on the provider response. The targeted response is transmitted to the user device of the user.

20 Claims, 5 Drawing Sheets

(56) References Cited

U.S. PATENT DOCUMENTS

| | | | |
|---|---|---|---|
| 11,275,675 B2* | 3/2022 | Shi | G06F 11/26 |
| 11,294,912 B2* | 4/2022 | Chung | G06F 16/248 |
| 11,301,911 B2* | 4/2022 | Venkatakrishnan ... | G06Q 30/06 |
| 11,392,987 B2* | 7/2022 | Hartzell | H04W 12/64 |
| 11,405,204 B2* | 8/2022 | Maurer | G06F 16/9024 |
| 11,461,785 B2* | 10/2022 | Redlich | G06Q 30/00 |
| 11,475,984 B2* | 10/2022 | Granvold | G16H 10/60 |
| 11,568,078 B2* | 1/2023 | Vandanapu | G06F 21/602 |
| 11,568,480 B2* | 1/2023 | Bjonerud | G06Q 40/03 |
| 11,636,945 B1* | 4/2023 | Gallegos | G06F 16/248 |
| | | | 705/2 |
| 2003/0080997 A1* | 5/2003 | Fuehren | G06Q 30/02 |
| | | | 715/744 |
| 2003/0140119 A1* | 7/2003 | Acharya | H04L 67/51 |
| | | | 709/219 |
| 2007/0220010 A1* | 9/2007 | Ertugrul | G06F 16/9535 |
| 2007/0282954 A1* | 12/2007 | Kim | H04L 67/306 |
| | | | 709/206 |
| 2010/0049623 A1* | 2/2010 | Lagadec | G06Q 30/0645 |
| | | | 705/26.1 |
| 2014/0201007 A1 | 7/2014 | Stack et al. | |
| 2015/0310466 A1* | 10/2015 | LaCivita | G06Q 10/087 |
| | | | 705/7.34 |
| 2016/0253710 A1* | 9/2016 | Publicover | H04N 21/2187 |
| | | | 705/14.66 |
| 2017/0178199 A1 | 6/2017 | Cessna et al. | |
| 2017/0194987 A1 | 7/2017 | Ivengar | |
| 2017/0220966 A1* | 8/2017 | Wang | G06Q 20/322 |
| 2017/0324831 A1* | 11/2017 | Renschler | H04L 67/025 |
| 2018/0357226 A1 | 12/2018 | Su | |
| 2020/0027133 A1 | 1/2020 | Segalov et al. | |
| 2020/0034917 A1* | 1/2020 | Wen | H04L 63/0421 |
| 2020/0193478 A1 | 6/2020 | Chakraborty | |
| 2020/0278988 A1 | 9/2020 | Prokoph | |
| 2020/0374251 A1* | 11/2020 | Warshaw | H04L 51/56 |
| 2020/0389438 A1* | 12/2020 | Chakraborty | G06F 21/6263 |
| 2021/0012246 A1* | 1/2021 | Hazard | G06N 7/01 |
| 2021/0042830 A1* | 2/2021 | Burke | G06Q 20/384 |
| 2021/0125161 A1* | 4/2021 | Crabtree | G06Q 20/102 |
| 2021/0157834 A1* | 5/2021 | Sivasubramanian | |
| | | | G06F 16/686 |
| 2021/0158234 A1* | 5/2021 | Sivasubramanian ... | G10L 15/26 |
| 2021/0158813 A1* | 5/2021 | Sivasubramanian | |
| | | | G06Q 30/016 |
| 2021/0173887 A1* | 6/2021 | Petersen | G06F 16/29 |
| 2021/0203784 A1* | 7/2021 | Konig | G06Q 30/01 |
| 2021/0271649 A1* | 9/2021 | Narayanaswami ... | H04L 9/3239 |
| 2021/0279774 A1* | 9/2021 | Fitzgerald | G06Q 30/0277 |
| 2022/0076283 A1* | 3/2022 | Oliveira | G06Q 10/0637 |
| 2022/0092619 A1* | 3/2022 | Fuisz | G06F 16/909 |
| 2022/0148014 A1* | 5/2022 | Lee | G06Q 30/0201 |
| 2022/0182363 A1* | 6/2022 | Bharti | G06F 21/6254 |
| 2022/0335156 A1* | 10/2022 | Raphael | G06F 16/25 |

OTHER PUBLICATIONS

"Hybrid Customer Data Platform", Hybrid CDP (Customer Data Platform) for Financial Services | Lemnisk, 4 pages, found at: https://www.lemnisk.co/hybrid-cdp/.

Virtual Private Cloud (VPC), VPC as the basis for customized clouds, 4 pages, Jul. 15, 2020, found at: https://open-telekom-cloud.com/en/products-services/virtual-private-cloud.

Bolychevsky, I. and Worthington, S., "Are Personal Data Stores about to become the Next Big Thing?", 9 pages, Oct. 4, 2018. Downloaded from the following website: https://medium.com/@shevski/are-personal-data-stores-about-to-become-the-next-big-thing-b767295ed842.

Levine, B., 'Consent is unworkable' for programmatic ads in the era of GDPR, 5 pages, Jan. 11, 2018, downloaded from the following website https://martechtoday.com/consent-unworkable-programmatic-ads-era-gdpr-209358.

Buckle, C., "Rethinking "Trust" in a New Era of Data Privacy", 9 pages, Oct. 10, 2018, downloaded from the following website: https://blog.globalwebindex.com/chart-of-the-week/trust-data-privacy/.

"How will GDPR impact on marketing and advertising professionals?", 7 pages, Sep. 20, 2017, downloaded from the following website: https://www.campaignlive.co.uk/article/will-gdpr-impact-marketing-advertising-professionals/1445057.

Mell, P. et al., "The NIST Definition of Cloud Computing", Recommendations of the National Institute of Standards and Technology, NIST Special Publication 800-145, 7 pages, Sep. 2011.

International Search Report and Written Opinion, International Application No. PCT/CN2022/082251, International Filing Date Mar. 22, 2022.

Afify, et al., "A Hybrid Filtering Approach for Storage Optimization in Main-Memory Cloud Database." Published Aug. 21, 2015. 9 pages. Egyptian Informatics Journal; vol. 16; pp. 329-337. Published by ScienceDirect. https://www.sciencedirect.com/science/article/pii/S1110866515000389/pdf.

Anonymous. "Framework for Reducing the Cost for Storage Clouds." Published Sep. 18, 2018. 6 pages. Published by IP.com. https://priorart.ip.com/IPCOM/000255337.

Anonymous. "Local Surrogate (LIME)." Accessed Dec. 23, 2020. 11 pages. https://christophm.github.io/interpretable-ml-book/lime.html.

Anonymous. "Partial Dependence Plot (PDP)." Accessed Dec. 23, 2020. 8 pages. https://christophm.github.io/interpretable-ml-book/pdp.html.

Anonymous. "Welcome to the SHAP documentation." Accessed Dec. 23, 2020. 2 pages. Published by SHAP. https://shap.readthedocs.io/en/latest/#.

Nuaimi, et al., "Partial Storage Optimization and Load Control Strategy of Cloud Data Centers." Published Apr. 20, 2015. 15 pages. The Scientific World Journal; vol. 2015; Article ID 836561; pp. 1-14. Published by Hindawi. http://downloads.hindawi.com/journals/tswj/2015/836561.pdf.

Pal, A., "Dimension Reduction—Autoencoders." Published Apr. 12, 2018. 12 pages. Published by Paperspace Blog. https://blog.paperspace.com/dimension-reduction-with-autoencoders/.

List of IBM Patents or Patent Applications Treated as Related, Dated May 15, 2023, 2 pages.

Ekambaram et al., "Cognitive Framework for Privacy-Driven User Data Sharing," U.S. Appl. No. 17/207,903, filed Mar. 22, 2021.

* cited by examiner

… (1)

PRIVATE CLOUD USER INSIGHT PRIVACY

BACKGROUND

The present disclosure relates to data privacy, and more specifically, to protecting user information and other data while generating a more tailored interaction between a user and various product providers.

Online product providers may include organizations that provide products in an online marketplace (e.g., the Internet). Product providers may provide goods, such as electronics, clothing, textiles, automobile parts, and the like. Product providers may provide online services, such as social media services, web-hosting services, and the like. Product providers may provide real-world services, such as lawn mowing, house cleaning, automobile repair, and the like.

SUMMARY

According to embodiments, disclosed are a method, system, and computer program product.

A user-initiated request from a user device of a user is detected. The user-initiated request is directed to a product provider, the user-initiated request includes one or more parameters. an anonymized request is created based on the one or more parameters. The anonymized request is sent to the product provider. A provider response is received from the product provider. A targeted response is generated based on the one or more parameters of the user-initiated request and based on the provider response. The targeted response is transmitted to the user device of the user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
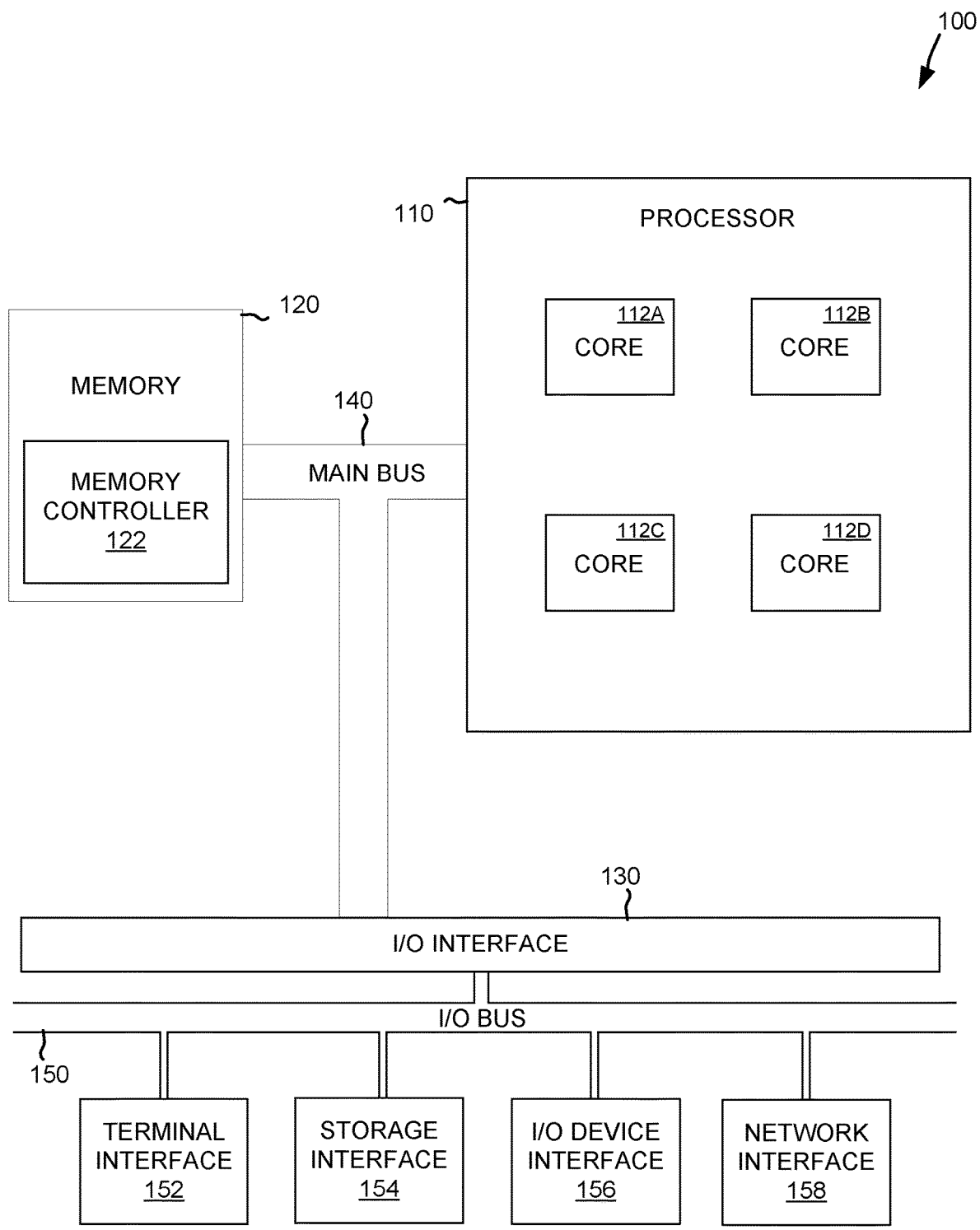
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data privacy; more particular aspects relate to protecting user information and other data while generating a more tailored interaction between a user and various product providers. While the present disclosure is not necessarily limited to such applications, various aspects of the disclosure may be appreciated through a discussion of various examples using this context.

Online product providers may include organizations that provide products in an online marketplace (e.g., the Internet). These online product providers (alternatively, products providers, or providers) may include goods providers, services providers, or other various products. For example, a provider may be a services provider that runs an online portal offering web-hosting services. In another example, a provider may be a goods provider that runs an online retailer selling various goods to users. The product providers may operate by receiving requests from a user through a user device, such as a smartphone or a laptop computer.

The product providers may parse the request as part of a fulfillment of the request. For example, an online retail may receive a request with one or more parameters in a request from a user device of the user. In detail, the user may be interested in purchasing a shirt. The online retailer may parse parameters from the user device that relate to a size, color, brand, team affiliation, and the like regarding shirts. The user may be looking for a small, green, shirt to wear while going to the beach, and the user device may transmit parameters indicating a size of small, a seasonality of summer, and a color of green. Responsive to the request, the product provider may return a list of shirts that match the parameters.

There may be benefits to the data that is received by the provider. First, the provider may use the data directly to benefit future interactions with the user. For example, the provider may save user information of the user, such as the name, address, and purchase history of the user. The provider may perform one or more algorithms on the user information to generate insights about the data. An insight may be one or more new data elements that include information that did not exist in the received data provided by the user or data that was created solely based on analysis of the received data and without input from a user. For example, if a user purchases a first item of clothing with a certain size and a second item of clothing with a second size, an insight may be new data. In this example, the new data may be a range of sizes that a user may prefer for clothing. In this example, the insight may be data that states a time of day that a user prefers to purchase a particular item. In this example, the insight may be a location within a region, or a location relative to a home (e.g., a bedroom, a living room) where a user prefers to purchase clothing. Algorithms may be methods, processes, and the like used to analyze the data of the user information and to draw conclusions regarding the data. For example, the provider may generate an insight that indicates the user prefers to purchase pink shirts in the fall months of a calendar year. Second, the provider may use the data directly to benefit interactions with other users. For example, the provider may gather data regarding a plurality of users that have sent requests from their user devices. The provider may perform analysis using an algorithm to generate an insight that many users prefer to purchase a coat in the second week of November each year.

Moreover, the product providers can gain additional benefits from the requests. Providers may benefit indirectly, by earning money, from the user information, the insights generated by the information, and other data of or related to the user. A first way that a provider may indirectly benefit, is by selling the data to other providers. For example, an online retail may have in place an agreement whereby if the online retailer collects or generates any data for a user, then they will share that data with a second online retailer. A second way that a provider may indirectly benefit is by a financial agreement with an advertising industry. Specifically, users may be considered an asset in the advertising industry. The advertising industry may value any and all data related to the user for selling advertising space. For example, an advertiser may sell data related to a user to companies or may use the data related to a user for providing more targeted advertising to a user. Advertising industry entities, such as marketing and advertising firms may also have pressure from other product providers to have as accurate as information as possible about a user. Often the information that product providers and advertisers want is detailed and specific (e.g., age, membership or other affiliation, national origin, and the like).

There may be many drawbacks to the user regarding the sharing of their information any insight generation, or any other data related to the user. For example, many times the information is of a very sensitive issue to a user (e.g., medical condition, status or protected class, a personal sensitive identification, personal behaviors, creed, or other information that a user may wish not to share). In another example, a user may find it unsettling or undesirable to have information shared in and of itself. Specifically, a user may not identify any particular information in and of itself sensitive or private, but the user may find it unsettling that other entities such as providers and advertisers have access to and are collecting and using the information related to the user.

A user may withdraw from using online services as a result of attempting to prevent the sharing of any data with providers. A user may not feel comfortable participating or using certain online providers. Consequently, online providers may find themselves having more difficulty in attracting customers. In other instances, users may install third-party utilities that block or attempt to block collection of data. These third-party utilities may be unvetted or unsafe. For example, the third-party utilities may use excessive processing power on a user device or may consume larger amounts of random-access memory (RAM) on the user device, and resultantly, cause slowdowns and or data loss on the user device.

Additionally, variously regulating entities, such as governments or other law creating bodies, have increasingly created various laws and regulations that may require all user information be kept, not collected, or otherwise not used in various circumstances. For example, the General Data Protection Regulation (GDPR) may require providers and advertisers not to collect or view certain user information and generated insights. The drawback to this is that advertisers and product providers may have to run their online operations in a less efficient manner. For example, a provider may have to run an online store without being able to personalize a result of a user-initiated request. This may lead to a user device receiving more results and slowing the processing of a user device or increasing the network bandwidth required to provide results from a product provider. Similarly, untailored advertisements received from an advertiser may result in slower responsiveness from a user device and may increase memory usage.

Insight Generation in Private Cloud Environments ("IGPCE") may perform with increased advantages over existing solutions. IGPCE may operate to provide for personalization of a user's experience across various online product providers and increase the customization of advertising or other offerings provided to a user without reducing the privacy of the user. IGPCE may facilitate the operations of highly personalized services, while increasing the trust that a user may have to share their consumption habits and other personal information. The IGPCE may operate while complying with more stringent data handling requirements, such as being compliant with GDPR.

Further, IGPCE may facilitate users to control not only the insights that are generated about them, but also to control the access and storage of user data, which may increase the likelihood that a user agrees to share user information and/or personalize their data and allow for data-based insights to be generated based on the user information. The use of IGPCE may improve quality of life functionality for a user, for example, a user may receive only tailored offering, advertising, and reduced search results when navigating various online providers. Consistently with this more tailored online experience, actual user information may be limited in how it is shared to providers. Further, in some embodiments, by utilizing IGPCE as an intermediary between a user device and an online product provider to receive or consume products (e.g., goods and services), the vast majority of or all of the data of the user may not be shared with any of the providers.

The IGPCE may operate by detecting user-initiated requests from user devices that are owned and controlled by the user. The IGPCE may perform analysis on the user-initiated requests as well as other user information that is provided to the IGPCE. For example, a user may log-in or sign up for service providing through the IGPCE and may receive an account and be assigned a private cloud. The user may provide user information such as their name, age, personal mailing address, and the like to the IGPCE. The private cloud of the IGPCE may be configured to store the user information (e.g., data related to the user).

In some embodiments, the private cloud may be configured to store insights that are generated about the user. For example, if a user while using the IGPCE to have the private cloud indirect browse for goods from an example product provider, the private cloud may collect one or more parameters of the user-initiated requests that are directed towards the product provider. The private cloud may also collect a purchase decision related to the goods, e.g., that the user purchased the good. The private cloud may perform an analysis related to the information of the purchase as well as the user-initiated request to generate one or more insights (e.g., the user prefers long jackets). The generated insights may also be stored in the private cloud and used for further online interactions. For example, if a subsequent request for goods or services to a product provider is detected, the private cloud may alter provider responses (e.g., rearrange results of a provider response, filter results of a provider response) based not only on the one or more parameters of a user-initiated request, but also based on the previously generated insights. For example, a user previously looked for blue socks, and a new search for shorts may be filtered based on the color blue.

The private cloud of the IGPCE may perform a smart orchestration to analyze information related to a user and their searching. In detail, the IGPCE may detect that a user device of the user is transmitting a user-initiated request to a product provider. In a first example, a user may be looking for a pair of shoes on a retail website, and the user device of the user may transmit a request for "size 10.5 tennis shoes" and the request may be directed to the retail website. The private cloud may intercept the user-initiated request and may perform analysis on the request to determine certain user-information of the user, such as a shoe size that is specified in the one or more parameters of the request from the user device. The private cloud of the IGPCE may operate by removing certain parameters from the user-initiated request to create an anonymized request. Continuing the first example, the private cloud may create an anonymized request that simply includes "size 9 to size 15 shoes" as the only parameters. The private cloud may send the anonymized request to the product provider and may responsively receive a provider response from the product provider. Continuing the first example, the private cloud may transmit through a network the request for "shoes" to an online shoe retailer, and may receive a list of shoes that match the "size 9 to size 15" anonymized request. The private cloud may further generate, based on the parameters of the user-initiated request, and based on the results in the provider response, a targeted response. For example, the private cloud may filter out all shoes other than size "10.5" shoes, and all types of shoes other than type "tennis shoes" to generate a targeted response. The private cloud may transmit the targeted response to a user device of the user.

In some embodiments, a portable component of the IGPCE may be running on the user device of the user. The portable component may be a plugin, such as a browser plugin. The portable component may be a daemon, job, or other background program running as a part of the software environment of the user device. The portable component may be a miniature version of an algorithm designed to perform searches on product providers and to generate insights based on user-initiated requests. The portable component may operate to perform the detection of user-initiated requests. The portable component may operate by preventing any of the product providers from receiving the user-initiated requests. For example, the portable component may intercept user-initiated requests from an outbound request queue, network stack, or other transmission component of a user device. The portable component may operate by transmitting the user-initiated requests to the private cloud of the IGPCE and also by receiving targeted responses from the private cloud.

The portable component may, e.g., be based on the website or online portal of a product provider, automatically pull various data features required for the IGPCE to improve insights that would normally be generated by the product provider. Specifically, the private cloud, such as an orchestration engine running on the private cloud may identify, based on the product provider, the type of product being searched for (in the one or more parameters of the user-initiated query) or based on insights of the user, a specific insight generating engine ("algorithm") for use by the portable component. For example, if a user is browsing for shirts on a first online retailer, the orchestration engine of the private cloud of the IGPCE may identify a particular algorithm that is capable of performing a particular type of search on the first online retailer and generating insights based on the online retailer. The offloading of insight generation of particular algorithms from the private cloud to a portable component of the IGPCE executing on the user device, may include technical benefits to the user of the user device. For example, processing power for insight generation may be distributed to a plugin running on a smartphone and may offload that processing power from the servers that host the IGPCE. This offloading in the aggregate may save on computing resources such as processing cycles and memory space.

In some embodiments, the IGPCE may operate without a portable component installed on the user device of the user. For example, the private cloud may host an online portal, website, or other network destination for a user to connect to and to browse product providers. The network destination may be contained, or all network traffic may flow through the network destination. The private cloud may monitor the traffic to detect user-initiated requests and may perform interception to prevent the requests from traveling on from the private cloud out to the product providers.

The IGPCE may also operate to provide a user with full control of their user information. For example, a user may receive a request from a particular product provider's smartphone app to share data or permit the product provider to generate insights based upon the data of a user. The user may respond to the request with a denial request; the denial request may be a request to not share information with the product provider. The IGPCE may detect the denial request and may not permit the sharing of user information and may initiate operation through the private cloud. For example, in the case a user provides a denial request on a smart phone app, the portable component of the IGPCE may initiate operation through the private cloud. In another example, in the case a user provides a denial request while on the private cloud, the IGPCE may initiate prevention of user information being provided to the product provider. The IGPCE may be configured to operate transparently. For example, if a user navigates to an online product provider to begin searching for a particular good or service, the product provider may request the share of data or permission of the product provider to generate insights based on user information provided by the user device of the user. The user may respond to the request with a permit request. The permit request may cause the user device of the user to communicate directly with the product provider to facilitate browsing and searching for the goods and services. Later, a user may decide that they no longer wish to share information with the product provider. The user may navigate through the user device to a particular settings preference pane or panel in a user interface of the user device. The user may select on the user device the previously permitted product provider and the user may select, use product provider without providing information. Responsive to detecting the user selection to use the product provider without providing information, the portable component on the user device may begin operating without providing user information to the product provider and instead to the private cloud of the IGPCE.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
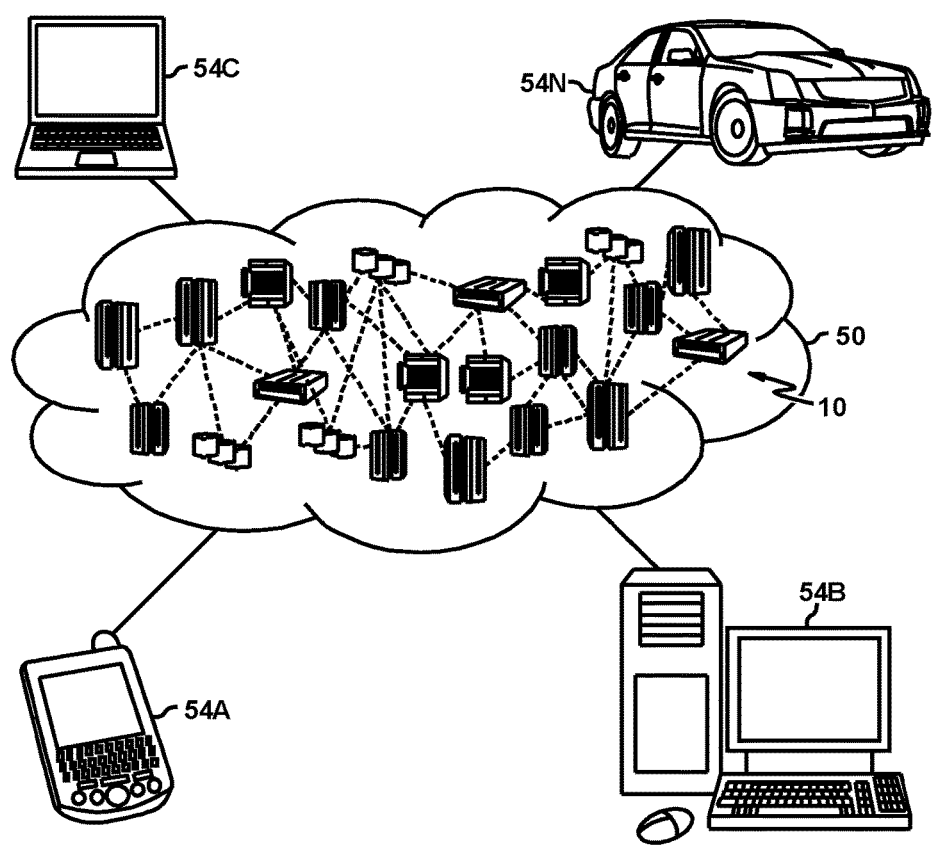
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
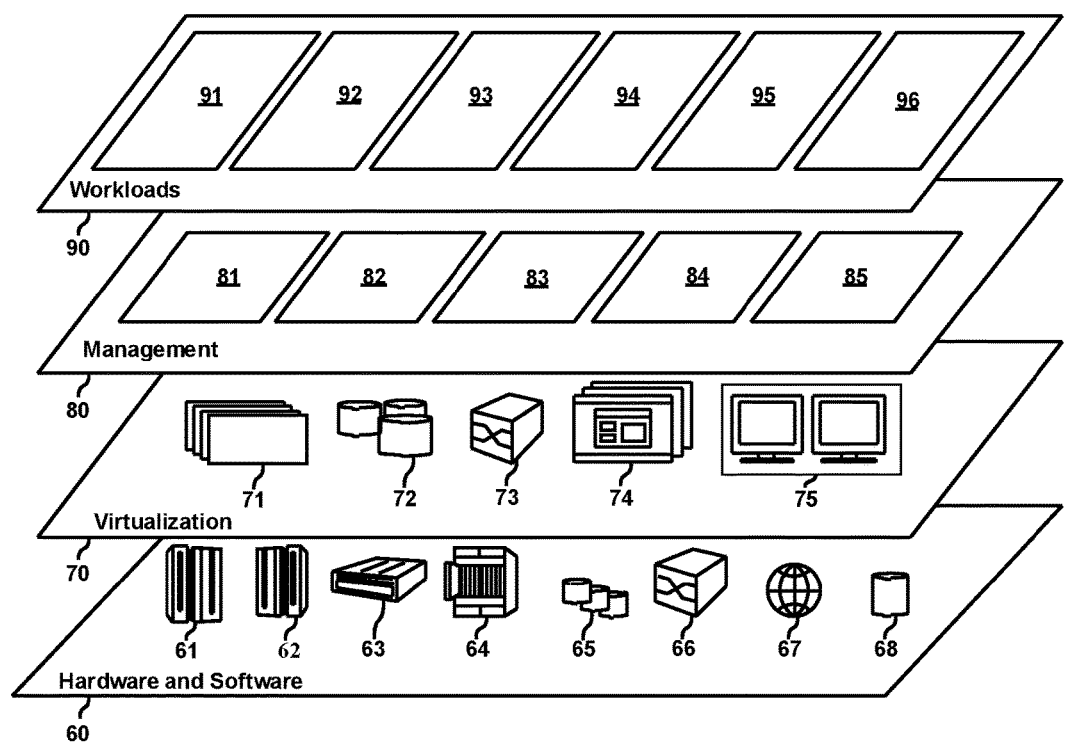
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an IGPCE 96.

Figure 4:
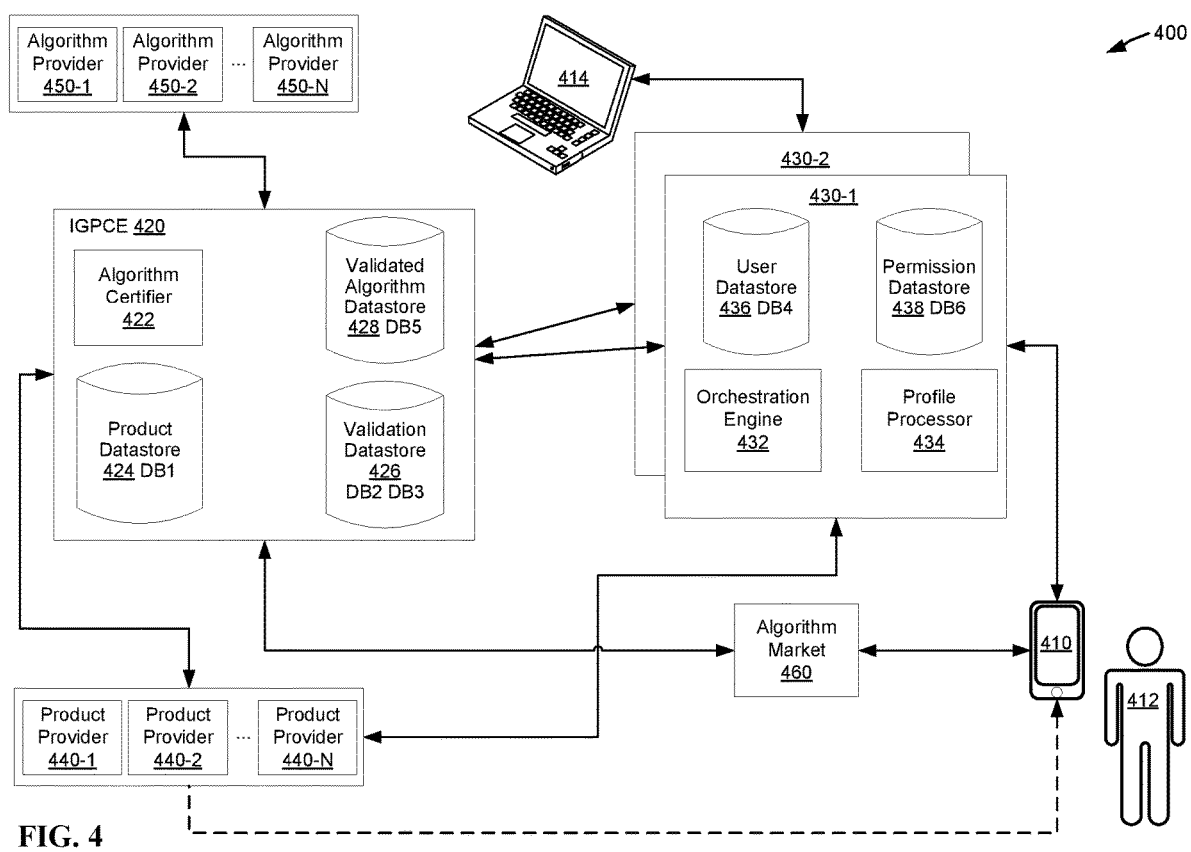
FIG. 4 depicts an example system for performing insight generation while preserving user privacy, consistent with some embodiments of the disclosure.

FIG. 4 depicts an example system 400 for performing insight generation while preserving user privacy, consistent with some embodiments of the disclosure. System 400 may operate based on receiving a request from a user device 410. The user device 410 may be a computing device, such as a smartphone, laptop computer, or other computing device. The user device 410 may be a user device of a user 412. User 412 may create, update, or otherwise interact with user information that may be stored on the user device 410. Another user device 414 may be a user device of a second user (not depicted). System 400 may leverage private cloud infrastructure to preserve the privacy of users, including user 412.

System 400 may include the following: an IGPCE 420 configured to receive requests from users for secure online interactions, and one or more private clouds 430-1 and 430-2 (collectively, 430) instantiated by IGPCE 420 to perform isolated computing. For example, IGPCE 420 may receive a request from a new user (not depicted) to register and begin using computing services to perform private online interactions. Responsively, the IGPCE 420 may be configured to create, instantiate, partition, or otherwise provide access to computing resources in the form of a new private cloud (not depicted). Each private cloud 430 may be assigned to perform insight generation and to facilitate private consumption and online browsing without providing one or more parameters to other online entities. The IGPCE 420 and/or the private cloud 430 may operate to collect insights, such as through registered user devices of users or other accessory devices that provide data; such as, user activities, experiences and preferences will be captured from multiple sources (purchase history, internet of things devices, user provided preferences, etc.).

For example, the private clouds 430 may operate to analyze data using one or more known techniques and to prevent the accessing of user data of users, such as user 412, from advertisers, online retailers, analytics firms, and the like. Each private cloud 430 may be assigned by the IGPCE 420 to a given user, and the user devices of the user. For example, user 412 may be assigned to private cloud 430-1 by the IPGCE 420 and processing of requests of user device 410 may be performed by private cloud 430-1. In another example, user device 414, of another user (not depicted), may be assigned to private cloud 430-2 for processing of requests.

The IGPCE 420 may be a computing device, such as one or more servers or computers, such as computer 100. IGPCE 420 may run as part of a large cloud computing infrastructure, such as cloud computing environment 50. Likewise, the private clouds 430 may each be an instanced amount of computer resources, such as a copy or instance of computer 100. Each private cloud 430 may run in a secure computing environment (e.g., a computing environment with isolated or unshared processing cycles, memory registers, storage locations, and the like). For example, a first virtual private cloud that is running inside of cloud computing environment 50 may be the host or logical location of private cloud 430-1. Continuing the example, a second virtual private cloud running inside of cloud computing environment 50 and logically separate from the first virtual private cloud may host private cloud 430-2.

The IGPCE 420 and the private clouds 430-1 may include one or more engines, processors, program code, or other logical modules configure to perform analysis on data, such as data related to a user (i.e., user information) and also to generate insights based on the analysis.

In some embodiments, analysis may include the execution of machine learning on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, a natural language processing system may include various components (not depicted) operating through hardware, software, or in some combination to perform analysis on user information and to generate insights on the user information (e.g., based on data provided by user 412 by way of user device 410). For example, a natural language processor, one or more data sources, a search application, and a report analyzer. The natural language processor may be a computer module that analyses the received content and other information (e.g., a module (not depicted) that executes as part of the IGPCE 420 or as part of a given private cloud 430). The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from user information of the user (e.g., a profile or registered browsing history of the user 412, one or more attributes or parameters that are provided by a user-initiated request from a user device 410. Various components (not depicted) of the natural language processor may include, but are not limited to, a tokenizer, a part-of-speech (POS) tagger, a semantic relationship identifier, and a syntactic relationship identifier. The natural language processor may include a support vector machine (SVM) generator to processor the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., a user-initiated request received from a user device 410 that includes one or more parameters). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving a user-initiated request from user device 410 to private cloud 430-1 at the natural language processing system, the natural language processor may output parsed text elements from the data. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

In some embodiments, the natural language processing system may leverage one or more of the example machine learning techniques to perform machine-learning (ML) text operations. Specifically, one or more processes, techniques, algorithms, or computer program code operations that are performed by a private cloud 430 may operate to perform machine-learning text classification and/or a machine-learning text comparison. Machine-learning text classification may include ML text operations to convert, characters, text, words, and phrases to numerical values. The numerical values may then be input into a neural network to determine various features, characteristics, and other information of words with respect to a document or in relation to other words (e.g., to classify a numerical value associated with a word may permit the classification of a word). Machine-learning text comparison may include using the numerical values of converted characters, text, words, and phrases for performing a comparison. The comparison may be a comparison of a numerical value of a first word or other text to the numerical value of a second word or other text. The determination of the machine-learning text comparison may be to determine a scoring, a correlation, or a relevant relationship (e.g., a relationship between a first numerical value of a first word and a second numerical value of a second word). The comparison may be used to determine if two words are similar or different based on one or more criteria. The numerical operations of a machine-learning text classification/comparison may be a function of a mathematical operation performed through a neural network, such as performing a linear regression, an addition, or other relevant mathematical operation of the numerical value representative of a word or other text.

The ML text operations may include word encoding, such as one-hot encoding of words from a tokenizer, POS tagger, semantic relationship identifier, syntactic relationship identifier, and the like. The ML text operations may include the use of vectorization of text, such as the vectorization of words from a tokenizer, POS tagger, semantic relationship identifier, syntactic relationship identifier, and the like. For example, a paragraph of text may include the phrase "orange is a fruit that grows on trees." Vectorization of the word "orange" may include setting input neurons of a neural network to the various words of the phrase including the word "orange." The output value may be an array of values (e.g., forty-eight numbers, thousands of numbers). The output values may trend towards "1" for related words and may trend towards "0" for unrelated words. The related words may be related based on one or more of the following: similar parts of speech, syntactical meaning, locality within a sentence or paragraph, or other relevant "closeness" between the input and other parts of natural language (e.g., other parts of the phrase "orange is a fruit that grows on trees", other parts of a paragraph that contains the phrase, other parts of language).

The IGPCE 420 may include a plurality of components, including at least the following: an algorithm certifier 422 configure to analyze algorithms that may be used to generate insights based on user information; a product datastore 424 configured to store a plurality of products; and a validation datastore 426 configured to store rules related to validating algorithms, and a validated algorithm datastore 428 configured to store records of algorithms that are verified to work with particular products. Each datastore (e.g., the product datastore 424, the validation datastore 426, and the validated algorithm datastore 428) may be one or more databases, tables, software, and associated hardware capable of storing structured data for access by the other components of IGPCE 420, and for access by the private clouds 430.

Each private cloud 430 may include a plurality of components, including at least the following: an orchestration engine 432 for managing the other components of the given private cloud 430; a profile processor 434 for performing analysis on user-initiated requests and generating anonymized requests; a user datastore 436 configured to store user information of a user; and permission datastore 438 configured to store permissions related to the use of specific algorithms and to privacy of a user. Each datastore (e.g., the user datastore 436, and the permission datastore 438) may be one or more databases, tables, software, and associated hardware capable of storing structured data for access by the other components of a given private clouds 430. The IGPCE 420 may also have access to each datastore of the private clouds 430. For example, the EGPCE 420 may initially generate the user datastore 436 and the permission datastore 438 in private cloud 430-1 based on receiving a request to join the IGPCE 420 from user device 410.

System 400 may also include a series of product providers 440-1, 440-2, up to 440-N (collectively, 440), and a series of algorithm providers 450-1, 450-2, up to 450-N(collectively, 450), an algorithm marketplace 460 for users to browse and access specific algorithms, and a portable component (not depicted) executing on a user device of the user. For example, a portable component executing on user device 410 may perform secure and private online browsing by communicating with private cloud 430-1 to communicate to the orchestration engine 432 and the profile processor 434.

The product providers 440 may be providers that offer access to and host retailers of goods, services, or other offerings online. For example, provider 440-1 may be an online retailer configure to allow access to goods and services through a website. In another example, provider 440-2 may be an online retailer configured to permit searches through user-initiated request in a smartphone app that is downloaded to user device 410. The algorithm providers 450 may be entities that create, develop, and otherwise provide algorithms that may be used by the IGPCE 420 and the private clouds 430 for browsing product providers 440 while preserving privacy of user devices. The algorithm providers 450 may be the same as the product providers 440. For example, product provider 440-2 may algorithm provider 450-1 such that a user may search through an online store of provider 440-2 and insights may be generated from an algorithm provided by algorithm provider 450-1.

Insights may be new data that is generated based on an analysis of user information. Insights may be generated by a product provider 440, an algorithm provider 450 through the IGPCE 420 or an advertiser (not depicted), or based on analysis of user information the product provider and/or the algorithm provider have access to. Insights may lead to a more personalized experience for a user (e.g., a first user likes blue shirts, a second user likes coffee cups that have football logos, a third user tends to wear L or XL sized shirts, the third user has a favorite baseball team Kansas City Royals™, the second user purchases cold coffee drinks between July and November, etc.). Insights may be associated with a purpose and use (e.g., shirt size/color for shopping for clothes).

The IGPCE 420 may be configured to preserve user privacy of the user while allowing for insights to be generated. Specifically, the IGPCE 420 may control and instantiate private clouds 430 for each user. The IGPCE 420 may generate the product datastore in conjunction with the product providers 440. For example, the IGPCE 420 may request data or information from product provider 440-1, and responsively product provider 440-1 may provide one or more categories and options for the products that are a part of the available products offered by the product provider 440-1. Continuing the example, the IGPCE 420 may store the received products and offerings in the product datastore 424. The IGPCE 420 may analyze the products and offerings that are listed in the product datastore 424 and may derive one or more attributes and values (e.g., provider name, product category, electronics listings, shoe listings, features of various products, colors, sizes, dimensions, costs, seasonality, associated hobby, etc.). The IGPCE 420 may provide access to the product datastore 424 such that algorithm providers 450 may develop algorithms based off of the listings in the product datastore.

The IGPCE 420 and/or the algorithm certifier 422 will generate the validation datastore 426 based on the various products contained in the product datastore. For example, validation datastore 426 may include a first validation database (not depicted). The first database may include particular algorithms and what they share (e.g., algorithm #34 is provided by algorithm provider 450-2 and asserts that it will generate color insight output based on taking in clothing as input, algorithm #42 is provided by algorithm provider 450-7 and asserts that it will generate a seasonal insight output based on taking in food and date of purchase as inputs). Continuing the example, validation datastore 426 may include a rules database. The rules database may include one or more rules that are used to validate the inputs of a given algorithm from a particular algorithm provider 450. Specifically, the rules database stored particular validations, rules, checks, etc. to ensure that a particular algorithm is operating correctly. For example, a first rule may be given an input of color, valid output may be blue/red/black/white. In another example, a second rule may be given an input of socket set tools, valid output may be standard/metric. In a third example, a third rule may be given an input of sports team, valid output may be cricket/football/baseball/basketball/track.

The IGPCE 420 may instruct the algorithm certifier 422 to perform one or more analysis or other operations on various algorithms from the algorithm providers 450. The algorithm certifier 422 may be a computer program, fixed function hardware, or some combination of software and/or hardware, configure to analyze each algorithm. In some embodiments, the algorithm certifier 422 may be a separate entity, such as an algorithm or other entity (e.g., a party that analyzes algorithms on behalf of a government entity, an antivirus program created by an antivirus corporation). The output of the IGPCE 420 and/or the algorithm certifier 422 may be entries into the validated algorithm datastore 428.

The validated algorithm datastore 428 may include entries that are related to various product providers 440, algorithm providers 450, and insights. For example, a first entry in validated algorithm datastore 428 may include "algorithm 12", "apparel providers", "color preference insights". A second entry in validated algorithm datastore 428 may include "algorithm 15", "electronics providers", "purchase timeframe after release insights". A third entry in the validated algorithm datastore 428 may include "algorithm 23", "sports memorabilia providers", "team affiliation insights". A fourth entry in validated algorithm datastore 428 may include "algorithm 45", "product provider 8, product provider 24, product provider 6", "seasonal buying insights".

In operation during online interaction, each private cloud 430 may be configured to assist in providing privacy to a given user and may also facilitate the browsing and shopping while providing insights to the user. Each private cloud 430 may also provide the user with the ability to decide to share one or more insights based on algorithms. For example, the orchestration engine 432 of private cloud 430-1 (or a portable component executing on user device 410) may detect a user-initiated query that is directed to product provider 440-2. The orchestration engine 432 may select a particular algorithm from the validated algorithm datastore 428. The orchestration engine 432 may use analysis techniques (e.g., natural language processing, machine learning, etc.) to select a particular algorithm. The orchestration engine 432 may provide an example of the results from a provider 440-2 based on the particular algorithm. The orchestration engine 432 may provide a list of algorithms capable of providing results from searching product provider 440-2. The user 412, through user device 410, may indicate a preference for using a particular algorithm that is presented from private cloud 430-1. The orchestration engine 432 may store in permission datastore 438 the preference to use a particular algorithm.

The orchestration engine 432 may prompt the user 412, through user device 410, to share or not share insights generated by a particular algorithm. In response, a program component of the IGPCE 420 executing on the user device 410 may render a share request to the user 412. Further, the user 412 may respond to the share request by indicating they do not want to share, they deny sharing, or that sharing is otherwise inadvisable (e.g., clicking a dialog box captioned "Do not share user information" in an interface of user device 410). User device 410 may communicate to the private cloud not to share any user information or insights with the given algorithm provider 450 or with any product providers 440. Private cloud 430-1 and/or orchestration engine 432 may create a preference or entry within the permission datastore 438. For example, a first entry in permission datastore 438 may include "algorithm 47", "provider category=electronics", "use algorithm=yes" and "insight sharing=no". In another example, a second entry in permission datastore 438 may include "algorithm 47" "product provider=product provider 38", "use algorithm=yes" and "insight sharing=yes" and insights generated by "algorithm 47" based on product searches on "product provider 38" may be shared by private cloud 430-1.

Preferences regarding the use of a particular algorithm of an algorithm provider may be communicated to the IGPCE 420 indirectly. For example, the IGPCE 420 and/or algorithm certifier 422 may validate the algorithms from the algorithm providers 450. The algorithms may also be in the form of a program component (e.g., a smartphone app configured to search a store). The program component may be a miniature version or plugin that executes on user devices and operates to generate insights directly on a user device. The IGPCE 420 upon the validation of a given algorithm, may publish to algorithm marketplace 460 the program component for accessing by user devices. The algorithm marketplace 460 may be a store that is controlled solely by the IGPCE 420, such as a validated-shopping store containing one or more algorithm program components that corresponds to a subset of the validated algorithms in the validated algorithm datastore 426. The algorithm marketplace may be a portal or other store that is a part of a smartphone, such as an app store.

Figure 5:
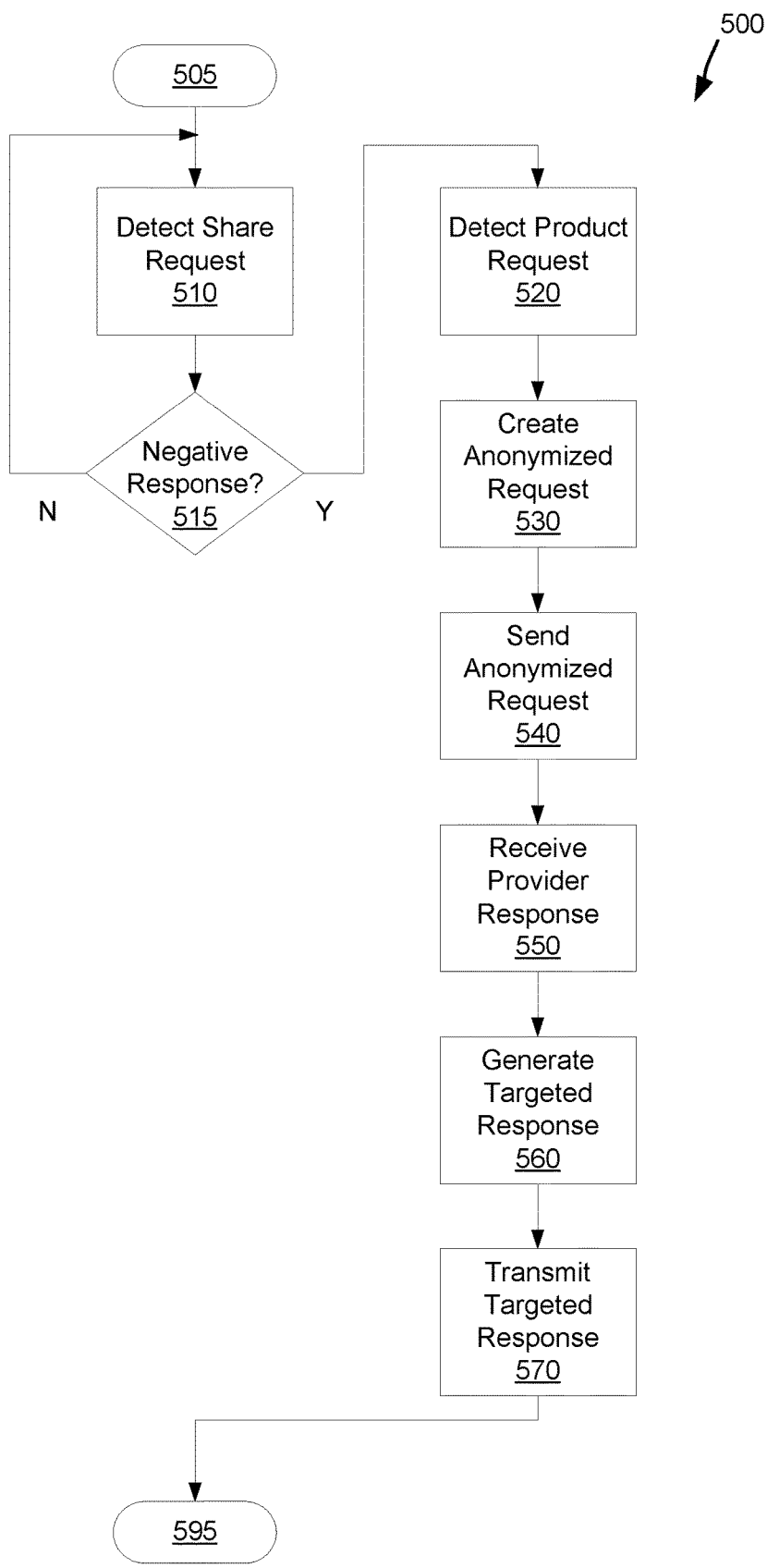
FIG. 5 depicts an example method of performing online operations of a user device while preserving the privacy of a user, consistent with some embodiments of the disclosure.

FIG. 5 depicts an example method 500 of performing online operations of a user device while preserving the privacy of a user, consistent with some embodiments of the disclosure. Method 500 may be performed by a computer system, such as computer 100. Method 500 may be performed by a cloud that virtualizes one or more computer resources, such as cloud computing environment 50. Method 500 may be performed by an insight generation private cloud environment. For example, IGPCE 420 may operate in conjunction with private cloud 430-1 and with a program component operating on user device 410 to perform one or more operations of method 500.

Method 500 begins at 505, and may execute continuously, serially, parallelly, or repeatedly. For example, method 500 may execute as part of a private cloud and/or a portable component installed upon a user device and may continually be executed for each application on the user device. A share request may be detected at 510. A share request may be a request from a product provider, such as a website interaction or smartphone app. The share request may be a request intended for a user to share user information and insights with the product provider. The user may respond to the share request with a request to share information with the product provider; such a response may be considered a positive response. The user may respond to the share request with a request to not share information with the product provider; such a response may be considered a negative response.

If a response is not a negative response, at 515:N, method 500 may continue by continuing to listen for and detect share requests at 510. If the response is a negative response, at 515:Y, method 500 may continue by listening for and detecting product requests at 520. A product request may be a user-initiated request, initiated through a user device, to search for or obtain information, or otherwise interact with a product provider. For example, user 412 may be searching an online retailer through user device 410. The user-initiated request may include one or more parameters. For example, a request from a user device may be "blue knee-length socks with foxes on them" and the parameters may include "blue", "socks", "foxes", "animals", "medium length", "knee length", and the like.

Upon a request being detected at 520, an anonymized request may be created at 530. The anonymized request may be a generalized version of the product request. For example, if a user device 510 initiates a request for "blue knee-length socks with foxes on them" an anonymized request may be generated at 530 that includes "animal print socks" as the criteria. The anonymized request may be sent to a product provider at 540. The product provider may be the same product provider that was a part of the detected product request at 520. The anonymized request may be sent by an intermediary. For example, a user may be browsing on a smartphone or other user device of the user. The performance of creating the anonymized request at 530 and the sending of the anonymized request at 540 may be by a component of the private cloud. For example, orchestration engine 432, profile processor 434, or another component of private cloud 430-1 may perform operations to create and transmit anonymized requests on behalf of user device 410.

A provider response may be received at 550. The provider response may be received from the same product provider that was the target of the anonymized request, sent at 540. The provider response may be received by a private cloud assigned to and performing operations for a user. For example, private cloud 430-2 may receive one or more provider responses on behalf of user device 414. The provider response that is received at 550 may include an overly large or voluminous number of results. For example, a search to a given product provider may include only the parameter "socks" and hundreds or thousands of results may be received by a private cloud.

A targeted response may be generated at 560. The targeted response may be based on the one or more parameters of the product request, detected at 520. The targeted response may also be based on the provider response, received at 540. Generating of the targeted response may include modifying a part of, or the entirety of, the provider response. Specifically, the provider response may include one or more results. The generating of the targeted response may include altering the one or more results. For example, given a response that includes five-hundred results for toy, and a product request for "red, white, and blue mini-basketball", a private cloud may filter the results for only "balls", "basketballs" "red balls", "multi-colored mini-balls", "blue basketballs", and the like. The filtering of the results may include deleting one or more of the results. The generating of the targeted response may include rearranging one or more of the results of the provider response. For example, given a response that includes two-thousand toy cars, and a product request for "yellow convertible sportscar", a private cloud may filter the results only for "sports car", "sportscar", "yellow", "convertible toy car", and the like. The targeted response may be transmitted to a user device of the user at 570.

Transmitting to a user device of the user, may include transmitting the response only to the user device that created the product request, at 520. Transmitting to a user device of the user, may include transmitting the response to a registered device of the user. For example, user 412 may register with IGPCE 420 to perform private browsing of online product providers. User 412 may use user device 410 to register for an account. During registration, user 412 may register other valid user devices. After generating a targeted response at 560, private cloud 430-1, may transmit the targeted response all of the valid user devices of user 412. After the targeted response is transmitted at 570, method 500 ends at 595.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    detecting a user-initiated request from a user device of a user, the user-initiated request directed to a product provider, the user-initiated request including one or more parameters;
    creating, based on the one or more parameters, an anonymized request;
    sending the anonymized request to the product provider;
    receiving a provider response responsive to the sending from the product provider;
    generating a targeted response, wherein generating the targeted response includes filtering the provider response based on the one or more parameters of the user-initiated request; and
    transmitting the targeted response to the user device of the user.

2. The method of claim 1, further comprising:
    generating, based on the one or more parameters of the user-initiated request, one or more insights related to the user.

3. The method of claim 2, further comprising:
    receiving user information related to the user; and
    updating, based on the user information, the one or more insights related to the user.

4. The method of claim 3, wherein the generating the one or more insights is performed by a private cloud related to the user, and wherein the private cloud stores the user information related to the user and the insights related to the user.

5. The method of claim 2, wherein the method further comprises:
    receiving, from an algorithm provider and before the generating of the targeted response, a request to process user-initiated requests with the algorithm, wherein the request indicates one or more product provider types that are compatible with the algorithm, and wherein the request indicates one or more algorithm insights generated by the algorithm;
    determining, based on the one or more product provider types, a validity of the algorithm;
    updating, based on the one or more algorithm insights, the validity of the algorithm; and
    permitting, based on the validity of the algorithm, the algorithm to be selected by users for generating targeted responses.

6. The method of claim 5, wherein the generating the targeted response is further based on an algorithm from an algorithm provider, and further comprising:
    providing, before the generating the targeted response and to the user, a sample output of the algorithm related to the user-initiated request;
    sending, before the generating the targeted response and to the user, an algorithm request to provide insights based on the algorithm;
    receiving, before the generating the targeted response and from the user, an algorithm response to use the algorithm;
    displaying, to the user and based on the algorithm and after the transmitting the targeted response, a share request to share an algorithm insight of the algorithm with the algorithm provider; and
    receiving, from the user, a share response related to the share request.

7. The method of claim 1, further comprising:
    receiving user information related to the user; and
    generating, based on the user information, one or more insights related to the user.

8. The method of claim 7, further comprising:
    updating, based on the one or more parameters of the user-initiated request, the one or more insights related to the user.

9. The method of claim 7, further comprising:
    detecting a second user-initiated request from the user device of the user, the second user-initiated request directed to a second product provider;
    creating, based on the second user-initiated request and based on the one or more insights related to the user, a second anonymized request;
    providing the second anonymized request to the second product provider;
    receiving a second provider response from the second product provider;
    generating, based on the second user-initiated request and based on the second provider response, a second targeted response; and
    transmitting the second targeted response to the user device of the user.

10. The method of claim 9, further comprising:
    updating, based on the second user-initiated request, the one or more insights related to the user.

11. The method of claim 1, wherein the provider response includes one or more results, and wherein the generating the targeted response includes altering the one or more results based on the one or more parameters of the user-initiated request.

12. The method of claim 11, wherein the altering the one or more results includes deleting a subset of the results.

13. The method of claim 11, wherein the altering the one or more results includes rearranging the results.

14. The method of claim 1, wherein the anonymized request does not include all of the one or more parameters.

15. The method of claim 1, further comprising:
    detecting, by a plugin operating on the user device, a request to not share information with the product provider, and wherein the creating the anonymized request is based on the indication.

16. The method of claim 15, further comprising:
    preventing, by the plugin operating on the user device and based on the request to not share information, the product provider from receiving the user-initiated request.

17. A system, the system comprising:
    a memory, the memory containing one or more instructions; and
    a processor, the processor communicatively coupled to the memory, the processor, in response to reading the one or more instructions, configured to:
        detect a user-initiated request from a user device of a user, the user-initiated request directed to a product provider, the user-initiated request including one or more parameters;
        create, based on the one or more parameters, an anonymized request;
        send the anonymized request to the product provider;
        receive a provider response from the product provider;
        generate a targeted response, wherein generating the targeted response includes filtering the provider response based on the one or more parameters of the user-initiated request; and transmit the targeted response to the user device of the user.

18. The system of claim 17, wherein the processor is further configured to:
  generate, based on the one or more parameters of the user-initiated request, one or more insights related to the user.

19. A computer program product, the computer program product comprising:
  one or more computer readable storage media; and
  program instructions collectively stored on the one or more computer readable storage media, the program instructions configured to:
    detect a user-initiated request from a user device of a user, the user-initiated request directed to a product provider, the user-initiated request including one or more parameters;
    create, based on the one or more parameters, an anonymized request;
    send the anonymized request to the product provider;
    receive a provider response from the product provider;
    generate a targeted response, wherein generating the targeted response includes filtering the provider response based on the one or more parameters of the user-initiated request; and
    transmit the targeted response to the user device of the user.

20. The computer program product of claim 19, wherein the program instructions are further configured to:
  receive user information related to the user; and
  generate, based on the user information, one or more insights related to the user.

\* \* \* \* \*